No. 697,012. Patented Apr. 8, 1902.
W. B. POTTER.
CONTROLLER FOR ELECTRIC MOTORS.
(Application filed Aug. 8, 1898.)
(No Model.) 2 Sheets—Sheet 1.

WITNESSES.
A. H. Abell.
O. F. Macdonald

INVENTOR.
William B. Potter.
by Albert G. Davis
Atty.

No. 697,012. Patented Apr. 8, 1902.
W. B. POTTER.
CONTROLLER FOR ELECTRIC MOTORS.
(Application filed Aug. 8, 1898.)
(No Model.) 2 Sheets—Sheet 2.
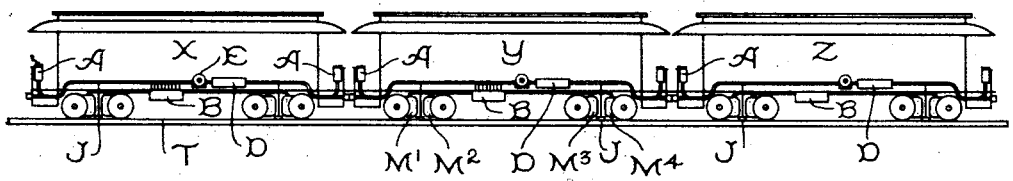
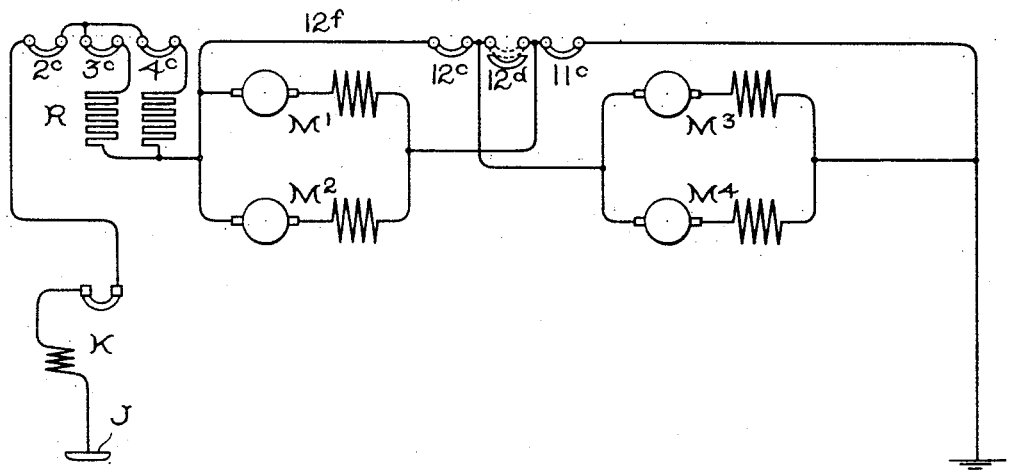
WITNESSES.
A. H. Abell.
A. F. Macdonald.
INVENTOR.
William B. Potter,
by Albert G. Davis
Atty.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

CONTROLLER FOR ELECTRIC MOTORS.

SPECIFICATION forming part of Letters Patent No. 697,012, dated April 8, 1902.

Application filed August 3, 1898. Serial No. 688,061. (No model.)

*To all whom it may concern:*

Be it known that I, WILLIAM B. POTTER, a citizen of the United States, residing at Schenectady, in the county of Schenectady, State of New York, have invented certain new and useful Improvements in Controllers for Electric Motors, (Case No. 748,) of which the following is a specification.

In certain systems of control for electric motors, both where the motors are mounted on a single car and where they are mounted on a number of cars which are connected to form a train, the controlling has been accomplished by a plurality of separately-actuated contacts, constituting what I have termed a controller of the "separately-actuated-contact" type as distinguished from the ordinary controller, in which the corresponding movable contacts are carried by a cylinder and moved all together. Systems of control for electric motors have also been provided in which a source of energy other than that which supplies current to the propelling-motors has been provided for actuating the circuit-changing contacts either during their ordinary operation or when the main source of energy failed.

My invention relates to systems of the class above described, and has for one of its objects to improve the construction and arrangement of the controller parts, so as to prevent injury to the motors and controllers, due to careless manipulation on the part of the motorman, and to insure the action of the contacts at the proper time.

My invention further relates to certain details of construction more fully described and claimed hereinafter.

Figure 1:
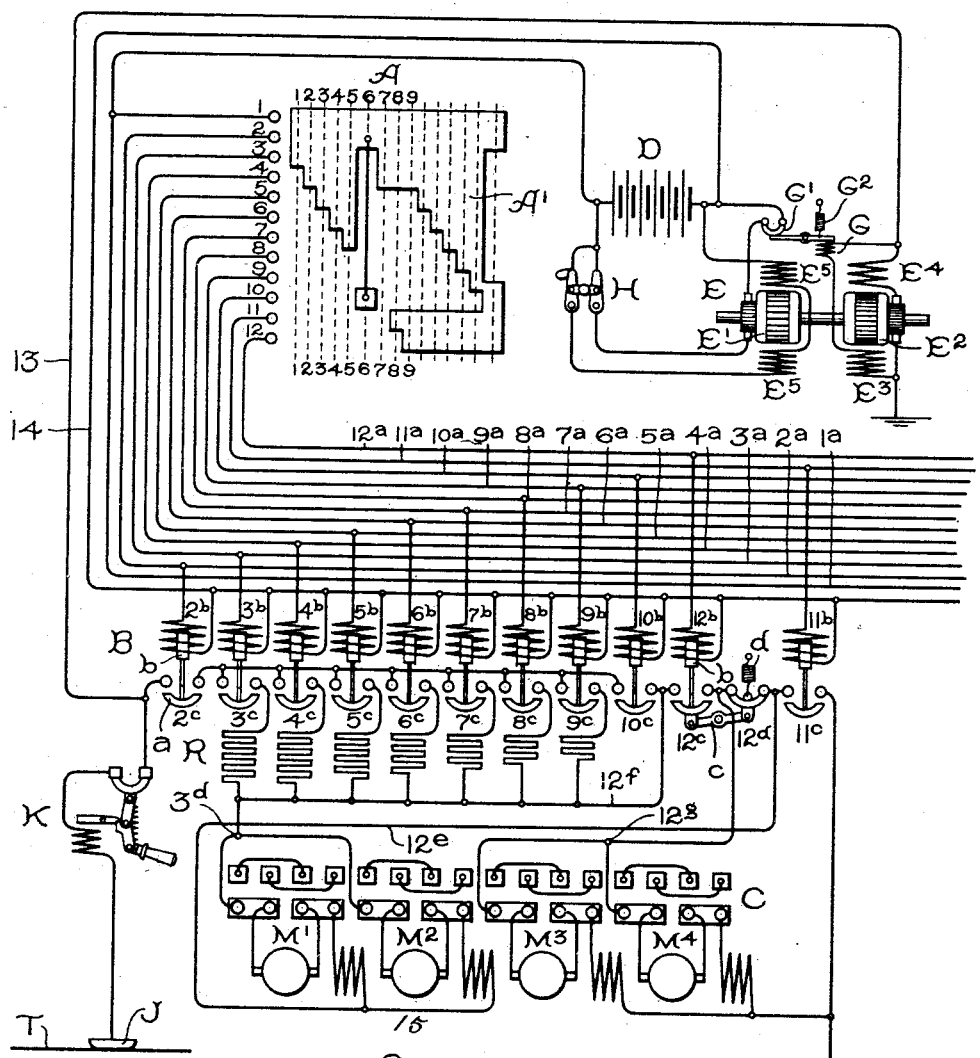
Figure 2:
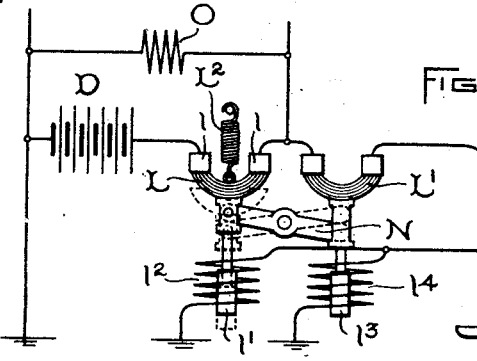

In the accompanying drawings, which show an embodiment of my invention, Figure 1 is a diagram illustrating the circuit connections of the system. Fig. 2 shows a modified arrangement of the storage-battery connections for such a system as is shown in Fig. 1, together with a novel circuit-breaker for protecting the storage battery and for insuring its connection to the translating devices upon failure of the main source of supply. Fig. 3 is a diagrammatic illustration of a three-car train, and Fig. 4 is a diagram of the motor connections when changing from series to parallel.

My invention has its greatest utility in connection with train systems of control; but it can be applied equally well to single-car control, and as each motor-car is a unit in itself—that is, provided with its own motors, controllers, and contact device—a description of the circuits of a single car will be sufficient.

Referring to Fig. 3, X, Y, and Z represent three motor-cars, which are connected to form a train. Each car is provided with a contact-shoe J, arranged to slide along the fixed conductor T and supply current to the motors $M'$, $M^2$, $M^3$, and $M^4$, as well as other translating devices mounted on the car. The wires of each car are formed into a cable, and the cables of the several cars are united in such manner that corresponding wires are connected. Connected to the cable of each car are one or more master-controllers A. These are so arranged that the controlling of the train may be accomplished from any one of them. Each car is provided in addition with a motor-controller B, composed of a plurality of separate electromagnetically-actuated contacts arranged to vary the resistance and circuit relations of the propelling-motors. A storage battery D is employed on each car to actuate the contacts, and the said batteries are charged by means of motor-generators E or directly from line.

Referring to Fig. 1, the construction and arrangement of the various parts of the controllers will be described in detail. The master-controller A consists of a set of moving contacts A' and a set of stationary brushes 1 to 12, inclusive. The brushes are connected to the cable-wires $1^a$ to $12^a$, inclusive, which wires are connected to the coils $2^b$ to $12^b$. The circuits of the propelling-motors are controlled by means of a plurality of separate contacts $2^c$ to $12^c$, inclusive, and $12^d$, operated by these coils. Each separate switch or contact is here shown as consisting of a moving core $b$, carrying at its lower end a brush or contact $a$. Ordinarily this arrangement would be perfectly satisfactory, and the fact that the magnets take a certain definite time to act would be of no moment; but in certain cases, as where the motors are changed from series to parallel relation, I have found that it is necessary to insure the opening of certain contacts before certain other contacts are closed; otherwise a direct connection will be established from the trolley to ground. In the arrangement illustrated in the drawings it is essential in order to avoid a short-circuit in passing from series to parallel that the contact $12^d$ shall be opened before the contact $12^c$ is closed and in passing from parallel to series that the contact $12^c$ shall be opened before $12^d$ is closed, and according to my invention I provide a means for compelling the required action. One of the arrangements which I may use for accomplishing this result is illustrated in the drawings and consists of a lever $c$, pivoted between and mechanically connecting the two contacts, so that they constitute a single switch. These contacts are shown as being actuated in one direction by the coil $12^b$ and in the other direction by the helical spring $d$; but it is evident that the contacts could be operated in both directions by magnet-coils. By this arrangement it is impossible for the contacts $12^c$ and $12^d$ to be closed simultaneously, the importance of which will be more fully referred to hereinafter. It is evident that this feature of my invention need not be applied to the series-parallel contacts of the controller, but may be applied to other contacts as well. A reversing-switch is also provided for reversing the direction of rotation of the propelling-motors. The means for operating this switch have been purposely omitted to render the drawings more clear; but it is evident that the switch could be actuated by magnets of a form corresponding to those shown in the motor-controller.

It being desirable in systems of motor control employing electrically-actuated devices for changing the resistance and circuit connections of the motors to provide a separate source of energy for operating the controller, a battery D is provided for each vehicle, which is mounted in any suitable manner thereon. To maintain the storage batteries charged to the proper degree, I have shown in Fig. 1 a motor-generator E, mounted on each car, consisting in the present instance of separate armatures $E'$ and $E^2$, mounted on a single shaft or otherwise connected for simultaneous movement. The armature $E^2$ is connected to the line side of the system and acts as a motor to drive the armature $E'$ as a generator. The field excitation of the motor-armature is furnished by a shunt-winding $E^3$ and a series winding $E^4$. In circuit with the shunt-field winding, and therefore controlled by the potential of the main source, is a magnet-coil G, which when the voltage of the main source of supply is above a certain point will hold the switch $G'$, which is in series with the generating-armature, in the position shown against the action of the helical spring $G^2$; but as soon as the voltage drops below that point the switch will be opened by the spring and interrupt the charging-circuit of the battery. The field excitation of the generator $E'$ is supplied by shunt-coils $E^5$. These coils are connected to the positive and negative sides of the battery and are so arranged that their circuit is not interrupted when the switch $G'$ opens. This arrangement prevents the destructive discharge of the field-magnets. A double-pole switch H is provided to interrupt the circuit of the generator and is so arranged that the armature-circuit is first interrupted and later the circuit of the field-magnet. The storage battery D is operatively connected to the controller-circuit at all times, so that the action of the various contacts can be controlled irrespective of the condition of the main source of supply.

The main circuit on each car from the contact-shoe J through the motors and controllers is controlled by an automatic circuit-breaker K, which may be adjusted to open at any definite flow of current.

The motors are shown in this case as being permanently connected in pairs and the grouping of the pairs changed from series to parallel; but in so far as the operation of my invention is concerned the number and permanent arrangement of the motors may be widely varied.

For convenience in reading the diagram all wires, brushes, and magnet-coils which are electrically connected or operate together are given the same reference-letter, but a different exponent—for example, brush 2 is connected to cable-wire $2^a$ and wire $2^a$ is connected to magnet-coil $2^b$, which actuates contact $2^c$.

The operation of my invention is as follows: Assuming that the parts are as shown in Fig. 1 and that it is desired to connect the motors in series, the circuit from the source of supply T is permanently closed through the contact-shoe J, circuit-breaker K, wire 13, field-magnet $E^4$, armature $E^2$, and ground. This causes the motor-generator to deliver current to the battery D. The battery being charged, as soon as the contact $A'$ is advanced to a point where the brushes rest on line 1 1 of the master-controller current will flow from the positive pole to the brush 1, thence by contact $A'$ to brushes 2 and 3 in multiple, thence by cable-wires $2^a$ and $3^a$ to the coils $2^b$ and $3^b$, thence to the cable-wire 14, and to the negative side of the battery. This closes the motor-controller contacts $2^c$ and $3^c$, and the circuit through the motors is as follows: Current passes from trolley T through the circuit-breaker K, contacts $2^c$ and $3^c$, the first section of the graduated resistance R, to point $3^d$, where the circuit divides, one path being to the reversing-switch C, to the armature of motor $M'$, to the reversing-switch C, to the field of motor $M'$, to wire $12^e$. Returning to point $3^d$, the second path is to the reversing-switch C, through the armature of motor M², the field of motor M² to wire 15, where it unites with the circuit from motor M'. The circuit continues from wire 12ᶜ through the contact 12ᵈ to the contact 12ᵍ, where the circuit divides, one path being to the reversing-switch C, the armature of motor M³ to the reversing-switch C, through the field-magnet of motor M³ to ground. Returning to point 12ᵍ, the second circuit is through the reversing-switch C to the armature of motor M⁴, thence to the reversing-switch and field-magnet of motor M⁴, and to ground. With the circuits arranged as described the motors M' and M² are united in multiple to form one pair, and motors M³ and M⁴ are similarly united to form the second pair, and the pairs, treated as though they were single motors, are united in series relation. For the embodiment of this invention there might be only two motors. To increase the speed of the motors, the master-controller A is advanced step by step, which causes the several resistance-controlling magnets to be energized and cut sections of resistance R into multiple with the one already in circuit, thereby decreasing the total resistance of the circuit. When the cylinder has advanced to a point where the brushes rest on line 6 6, the magnet-coil 10ᵇ becomes energized, which moves the contact 10ᶜ upward and closes the circuit at this point. When this contact is closed, the circuits of the magnets 3ᵇ to 9ᵇ, inclusive, are opened, thus deënergizing the magnets and permitting the corresponding contacts in the motor-circuit to open. The circuit through the resistances is opened, and all of the current passes directly to the motors by way of contact 10ᶜ. When the master-controller is advanced to a point where the stationary brushes rest on line 7 7, which is a transition step, the sections of resistance controlled by the magnets 3ᵇ and 4ᵇ are cut into circuit by reason of the brushes 3 and 4 resting on the contact-cylinder. With this arrangement the propelling-motors are connected in series with a considerable amount of resistance. In passing to position 8 8 the brush 11 engages the contact A', and a circuit is completed through the magnet-coil 11ᵇ. This closes the contact 11ᶜ, and a ground-circuit is established which shunts the pair of motors M³ M⁴. When the master-controller has advanced to a point where the brushes rest on the line 9 9, brush 12 will rest on the contact A', and the magnet-coil 12ᵇ will be energized. This causes the contact 12ᶜ to close, and because the contacts 12ᶜ and 12ᵈ are connected to each other the contact 12ᵈ begins to open before the contact 12ᶜ is closed. The opening of the contact 12ᵈ interrupts the shunt-circuit which formerly existed around the motors M³ and M⁴, and the closing of the contact 12ᶜ completes the multiple connection of the pairs of motors.

In controllers employing separately-actuated contacts as previously constructed the contacts corresponding to 12ᶜ and 12ᵈ in the present arrangement have been operated independently by means of separate electromagnets. When thus operated, there is always a danger that the one of these contacts will close before the other is opened, and in such case a short-circuit will be produced. By connecting the contacts so that one must open before the other is closed this danger is avoided, and if the connection is mechanical, as in the embodiment illustrated in the drawings, the two contacts may be operated by a single electromagnet in connection with a returning-spring instead of by the two separate electromagnets heretofore employed. By referring to Fig. 4 the utility of the connections between the contacts 12ᶜ and 12ᵇ will be rendered apparent. Supposing the contacts to be operated by separate electromagnets, in the series position of the controller the electromagnet for actuating the contact 12ᵈ would be energized and this contact closed. If now the motorman should manipulate his master-controller rapidly from the series to the parallel position, it might happen that the contact 12ᶜ, operating to connect the motors in multiple, would be actuated and closed before the contact 12ᵈ had time to open, and if both of these contacts should be closed at the same time, even though it be only for an instant, the system would be short-circuited. This will be readily understood by tracing the circuits which exist when the change is being made from series to multiple. These circuits may be traced in Fig. 1; but they are indicated more clearly in the diagram of Fig. 4. The closing of the contact 11ᶜ shunts the second motor pair at a time when the pairs are still connected in series by the contact 12ᵈ. If now the contact 12ᶜ should be closed before 12ᵈ is actually opened, a circuit will be completed from trolley through the circuit-breaker K, resistance-sections 3ᵉ and 4ᵉ in multiple, conductor 12ᶠ, and contacts 12ᶜ, 12ᵈ, and 11ᶜ, directly to ground.

As already stated, the particular construction shown in the drawings is desirable, for the reason that it reduces by one the number of the electromagnets in the controller; but it is of course unnecessary to follow the exact construction shown in the drawings, so long as the feature of positively interrupting the circuit at contact 12ᵈ before the circuit at contact 12ᶜ is completed is observed.

After the motors have been connected in parallel and it is desired to increase the speed the master-controller A is advanced step by step, which causes the magnet-coils to be energized, thereby attracting their armatures and cutting out one section after another of the resistance. To cut the motors out of circuit for stopping, the master-controller is actuated in the reverse manner to that described above. When it is desired to reverse the direction of rotation of the propelling-motors, the switch C is moved to a point where the brushes rest on the upper row of contacts.

In Fig. 2 I have shown a modified arrangement of the storage-battery connections, in which the storage battery or auxiliary source is charged directly from the line or main source. I have shown also in this figure a new form of circuit-breaker which may be advantageously employed in this connection. When the storage battery is connected in the manner shown in this figure, if the circuit-breakers at the control-station open or if for any other reason the main source fails and the motorman does not immediately return his controller to the off position there will be a circuit from the battery through the propelling-motors, which, together with that normally existing through the actuating-magnets of the controller and the other car-wiring, virtually amounts to a short circuit on the battery. Also if the potential of the line becomes materially reduced the battery may discharge into the line. To provide for these contingencies, I employ a circuit-breaker comprising two movable contacts L and L', one of which is included in the battery-circuit between the battery and the translating devices which are operated therefrom and the other of which is connected between battery and line. The contact L is connected to a core $l'$, which core is actuated by a magnet-coil $l^2$, connected in shunt to the main circuit. A spring $L^2$ is connected between the contact L and a fixed point in such a manner that it exerts a pull, tending to maintain the contact L in its closed position, but which is not of itself strong enough to overcome the weight of the contact and the core. The contact L' is connected to a core $l^3$, which core is actuated by a magnet-coil $l^4$, also connected in shunt to the main circuit. The two cores are connected to each other by a pivoted lever N, the core $l'$ being directly connected therewith and the core $l^3$ being slotted at its upper end to receive the end of the lever and to form a lost-motion device. When the potential of the supply-circuit is normal, contact L is held closed by the action of the spring $L^2$ and the coil $l^2$, and the contact L' is held closed by the action of the coil $l^4$. When, however, the potential of the supply-circuit falls below a predetermined value, the weight of the core $l'$ and its contact L overpowers the spring $L^2$ and the coil $l^2$, and this contact opens the slot in the core $l^3$, permitting the lever N to play freely therein. By this arrangement the battery is prevented from discharging into the line when the line potential is low. The contact L' is maintained closed by the coil $l^4$ so long as current is flowing in the line; but upon the cessation of the line-current it drops and through the lever N forces the contact L into its closed position, the weight of the contact L' and core $l^3$ being so calculated that it is sufficient, together with the pull exerted by the spring $L^2$, to close the contact L. Thus a predetermined drop of voltage in the line causes the storage battery to be disconnected from the source of supply, while a complete failure of the line-current insures the closing of the storage-battery circuit to the translating devices on the car or train, while at the same time disconnecting the storage battery from the line-circuit. The translating devices are indicated at O, which may represent the actuating-coils $2^b$ $3^b$, &c., of the motor or a pilot-motor or the lights or electric brakes for the car or train.

While I have shown my invention in connection with a motor-control system, it is evident that it is not limited thereto, and in certain of its features it is applicable to any system of distribution.

What I claim as new, and desire to secure by Letters Patent of the United States, is—

1. In an electric-motor controller of the separately-actuated contact type, a contact for connecting the motors in series, a contact for connecting the motors in parallel, and a mechanical connection between said contacts whereby either one is caused to move to its open position when the other is moved to its closed position.

2. In an electromagnetic system of motor control, the combination with a contact for connecting the motors in series, of a contact for connecting the motors in parallel, a mechanical connection between said contacts whereby either moves to its open position when the other moves to its closed position, and an electromagnet for actuating said contacts.

3. In a system of control for electrical apparatus, the combination with switches therefor of a plurality of separately-actuated electromagnets for operating the switches respectively, means controlled by one of the switches for preventing the closing of another of the switches so long as the magnet of the former is energized, and means for completing the circuit of the magnets for operating the switches.

4. In a system of control for electric motors, the combination of a plurality of separate switches, magnet-coils for actuating the switches, a controller-switch capable of energizing any number of the magnet-coils at the same time, and means controlled by one of the separate switches for preventing simultaneous corresponding operation of another of the switches.

5. In a system of control for electric motors, the combination of a plurality of separate electromagnetically-controlled contacts for changing the resistance of the motor-circuit and also for grouping the motors in series or parallel relation, certain of the contacts being arranged to shunt one of the motors in changing from series to parallel, electromagnets for controlling the contacts, and means preventing the contacts from short-circuiting the motors when changing from series to parallel even when all of the magnets are simultaneously energized.

6. In a train system of control, the combi-